United States Patent
Aygül et al.

(10) Patent No.: US 12,489,537 B2
(45) Date of Patent: Dec. 2, 2025

(54) MULTIPLE RADIO FREQUENCY IMPAIRMENT ESTIMATION

(71) Applicant: Vestel Elektronik Sanayi ve Ticaret A. S., Manisa (TR)

(72) Inventors: Mehmet Ali Aygül, Istanbul (TR); Hüseyin Arslan, Istanbul (TR)

(73) Assignee: Vestel Elektronik Sanayi ve Ticaret A. S., Manisa (TR)

( * ) Notice: Subject to any disclaimer, the term of this patent is extended or adjusted under 35 U.S.C. 154(b) by 168 days.

(21) Appl. No.: 18/251,089

(22) PCT Filed: Oct. 28, 2021

(86) PCT No.: PCT/EP2021/080051
§ 371 (c)(1),
(2) Date: Apr. 28, 2023

(87) PCT Pub. No.: WO2022/090426
PCT Pub. Date: May 5, 2022

(65) Prior Publication Data
US 2024/0014914 A1     Jan. 11, 2024

(30) Foreign Application Priority Data
Nov. 2, 2020   (EP) .................... 20205244

(51) Int. Cl.
*H04B 17/391*   (2015.01)
*H04B 1/10*   (2006.01)
(Continued)

(52) U.S. Cl.
CPC ....... *H04B 17/3913* (2015.01); *H04B 1/1027* (2013.01); *H04B 17/104* (2015.01); *H04L 25/0254* (2013.01)

(58) Field of Classification Search
CPC .............. H04B 17/3913; H04B 17/104; H04B 1/1027; H04L 25/0254
See application file for complete search history.

(56) References Cited

U.S. PATENT DOCUMENTS

| | | |
|---|---|---|
| 6,721,279 B1 | 4/2004 | Zhang et al. |
| 11,977,958 B2 | 5/2024 | Faulhaber, Jr. et al. |
| 2012/0069940 A1 | 3/2012 | Guo et al. |

FOREIGN PATENT DOCUMENTS

| | | |
|---|---|---|
| EP | 2568616 A1 | 3/2013 |
| EP | 3418948 A1 | 12/2018 |

(Continued)

OTHER PUBLICATIONS

Jin et al., "Impact of transceiver RFIC impairments on MIMO system performance"; IEEE Transactions on Industrial Electronics, 2011, vol. 59:1, pp. 538-549.

(Continued)

*Primary Examiner* — Natasha W Cosme
(74) *Attorney, Agent, or Firm* — The Webb Law Firm

(57) ABSTRACT

The present disclosure relates to the detection of impairments in a received wireless communication signal. It may detect the presence of each of N types (sources) of impairments and possibly the amount of the impairment present in the received signal. The detection includes processing of the received signal by a trainable model trained to distinguish N sources of impairments by applying learning, with N being an integer larger than one. The trainable model outputs, for each source j of the N sources, a contribution of the j-th source of impairments to the obtained signal. The contribution may be binary, indicating the presence or absence of the j-th source of impairment, or may also indicate the amount of impairment.

12 Claims, 12 Drawing Sheets

(51) Int. Cl.
    *H04B 17/10*           (2015.01)
    *H04L 25/02*           (2006.01)

(56)           References Cited

FOREIGN PATENT DOCUMENTS

| | | |
|---|---|---|
| JP | 201057191 A | 3/2010 |
| JP | 20200141330 A2 | 9/2020 |
| KR | 20200087853 A | 7/2020 |

OTHER PUBLICATIONS

Kiayani et al., "Advanced receiver design for mitigating multiple RF impairments in OFDM systems: algorithms and RF measurements", Journal of Electrical and Computer Engineering, 2012, vol. 2012, Article ID 730537, pp. 1-16.

Pei, "Channel-based physical layer authentication" 2014 IEEE Global Communications Conference; IEEE, 2014. pp. 4114-4119.

Qi, "Analysis and Compensation of Channel and RF Impairments in MIMO Wireless Communication Systems", 2011, PhD Thesis, Universite du Quebec, Institut national de la recherche scientifique, 241 pages.

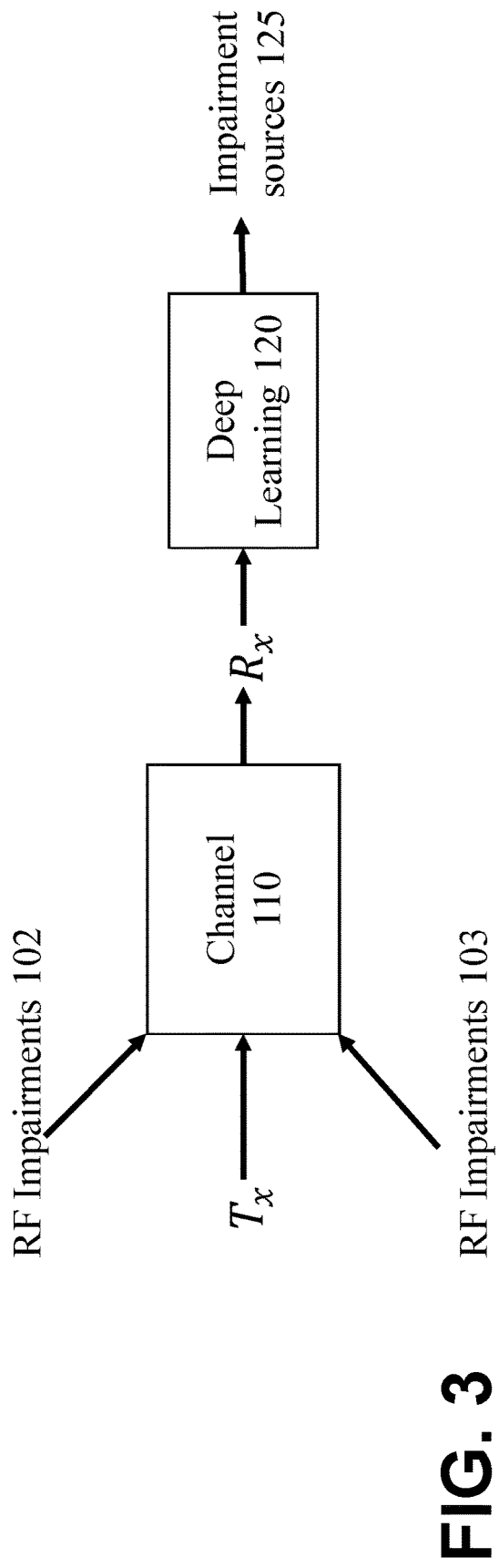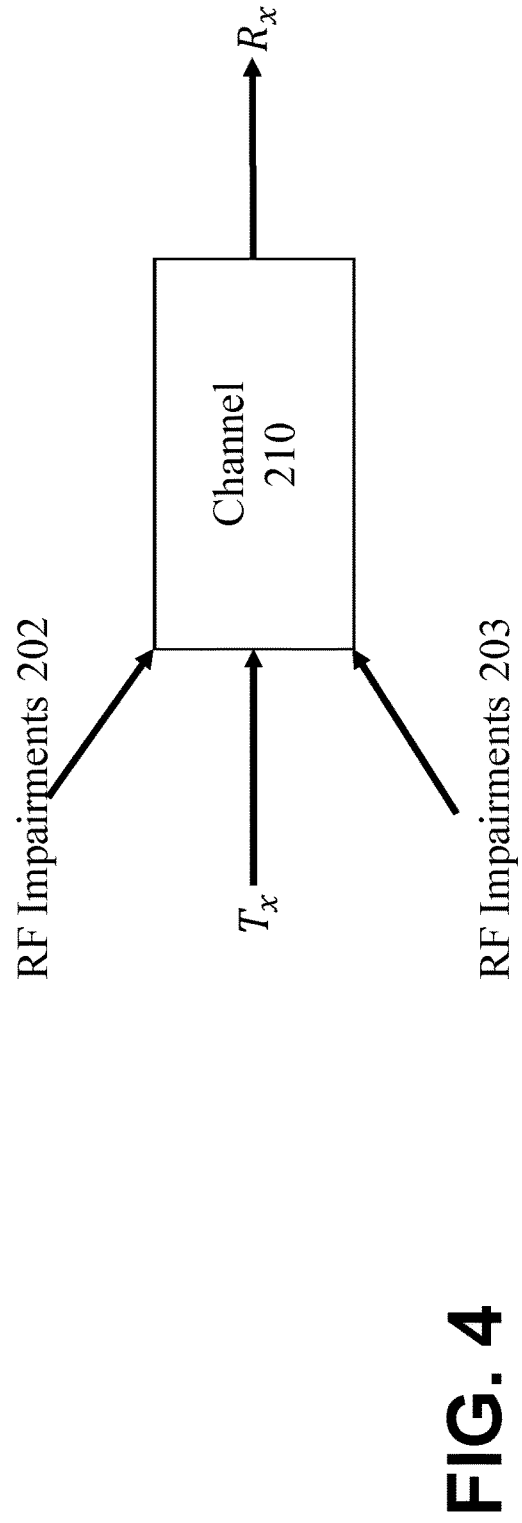
FIG. 3
FIG. 4

(a) (b)

MULTIPLE RADIO FREQUENCY IMPAIRMENT ESTIMATION

CROSS-REFERENCE TO RELATED APPLICATIONS

This application is the United States national phase of International Application No. PCT/EP2021/080051, filed Oct. 28, 2021, and claims priority to European Patent Application No. 20205244.5, filed Nov. 2, 2020, the disclosures of each of which are hereby incorporated by reference in their entireties.

BACKGROUND

Field

The present disclosure relates to the estimation of impairments related to transmission over a wireless channel.

Technical Considerations

In wireless communications, there are many sources of possible transmission impairments, which may lead to erroneous signal reception at a receiver. There are several possibilities to cope with errors. For example, the error may be at least partially compensated. The compensation may be performed at the transmitter by employing pre-distortion or at the receiver by compensating for frequency, phase, and/or time shifts. The compensation is possible at least to some degree, if some characteristics of the wireless transmitter, channel, and/or receiver are known.

Signal impairments may be introduced already at the transmitter, for instance by imperfections of the hardware. For example, the front end of the transmitter comprising a filter such as pulse shaping filters, a modulator for modulating the signal onto a carrier frequency, clock for timing the software/hardware operation, or a power amplifier may cause signal distortions such as frequency offset, phase offset, or timing offset. The distortions may be non-linear. Another source of impairments is the wireless channel. Wireless channels may suffer, for example, from path loss, multipath propagation, and/or some fading impairments or the like. Finally, the receiver may also be a source of hardware impairments, similar to those of the transmitter.

Future wireless communication systems are expected to supply ever-increasing data rates which require large transmission bandwidths and high carrier frequencies. Also, these systems are expected to provide radio transmitters and receivers with high flexibility and re-configurability. Therefore, these can ensure the value-added services in a variety of applications for seamless quality of service. However, building such compact, high-quality radio and low-cost and flexible equipment for future wireless communication systems is a very challenging task. As a result, various imperfections (impairments) are expected to take place in the radio transceivers. If these impairments are not properly estimated and compensated, they can decrease the performance of the wireless communication systems drastically.

In order to enable compensation of the signal transmission errors, it may be desirable to know the characteristics of errors.

SUMMARY

The present disclosure relates to methods and apparatuses for detecting multiple impairments by using model-based learning.

In particular, some embodiments of the present disclosure relate to detecting multiple impairments by the same trained module. Some embodiments also relate to the training of the module.

According to an embodiment, a method is provided for estimating radio frequency transmission impairments, the method comprising the steps of: obtaining a signal received over a wireless channel; processing the obtained signal by a trainable module trained to distinguish N sources of impairments, N being an integer larger than one; and outputting from the trainable module, for each source j of the N sources, a contribution of the j-th source of impairments to the obtained signal.

According to an embodiment, a method is provided for training a trainable module for estimating radio frequency transmission impairments, the method comprising the steps of: obtaining a training set comprising plural training data comprising input signal impaired by an impairment and by a transmission channel and an impairment indication indicating the type of the impairment, signal; inputting the training set into the trainable module; adapting parameters of the trainable module according to the inputted training set; and storing the adapted parameters for use in said estimating radio frequency transmission impairments.

According to an embodiment, an apparatus is provided for estimating radio frequency transmission impairments, the apparatus comprising processing circuitry configured to: obtain a signal received over a wireless channel; process the obtained signal by a trainable module trained to distinguish N sources of impairments by applying supervised learning, N being an integer larger than one; and outputting from the trainable module, for each source j of the N sources, a contribution of the j-th source of impairments to the obtained signal.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

An understanding of the nature and advantages of various embodiments may be realized by reference to the following figures.

FIG. 3 is a functional diagram of a multiple RF impairment estimation employing a trainable model.

FIG. 4 is a functional diagram of the phase of obtaining training data for a multiple RF impairment estimation.

DESCRIPTION

Figure 2:
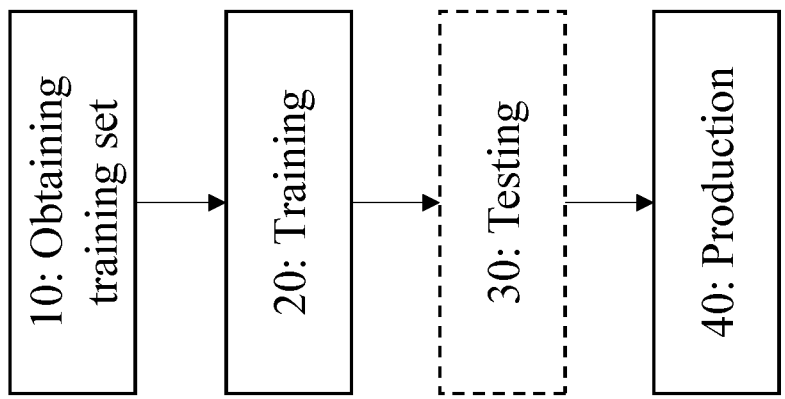
FIG. 2 is a flow diagram illustrating four phases of a generic model-based approach.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

There have been some works in the field of radio frequency (RF) impairment estimation and RF impairments compensation using model-based learning. The works on RF impairment estimation typically concern estimation of a single-RF impairment type using a model specifically trained for such type of impairment. For example, the detection may be performed by, at first, detecting the existence of a particular type of RF impairment and then estimating a numeric value of the detected impairment. However, the detection may be difficult and does not always provide accurate results. Any error in the detection may drastically degrade the performance of the RF impairment estimation, as well as possible further compensation. Besides, such methods based on detecting the presence of a particular type of artifact only overlook possible correlations between different kinds of impairments. The utilization of these correlations could improve the estimation quality. This is especially the case when the impairments are strongly correlated with each other. In some embodiments of the present disclosure, the detection of multiple RF impairments with one model enables an improvement of the overall performance.

On the other hand, works on joint RF impairments compensation are aiming at compensating the received signal for the effect of RF impairments of different kinds. They typically do not identify/recognize particular RF impairments types. The aim is to train or configure the compensation model so as to acquire a received signal as similar as possible to the transmitted signal. One of the disadvantages of these techniques is that they do not estimate the impairments. Their only interest is compensating for the joint effects of the impairments. Therefore, the trainable model cannot be used for any other purpose and is useless if the compensation cannot be performed well. According to some embodiments of the present disclosure, impairments are recognized end estimated separately. Therefore, even though some of the impairments may be estimated wrongly in some scenarios, some of them can still be used. Furthermore, if the RF impairments are estimated, they can be used for different purposes. For example, their effect can be compensated before the signal is sent. Such compensation before transmitting the signal is referred to as pre-distortion, as the signal which has to be transmitted is typically distorted in such a way that when impaired by the detected/estimated impairment, a signal possibly similar to the original signal is received.

Some embodiments of the present disclosure are widely applicable to any wireless system. In general, the RF impairment estimation is an important part of the physical layer. Therefore, the standards related to the physical layer of a system may make use of them. The present disclosure is readily applicable to wireless local area networks (WLANs) such as ZigBee, WiFi (e.g. IEEE 802.11 standard family, for example, the currently studied WiFi of $7^{th}$ generation, IEEE 802.11be), LoWPAN (Low-power Wireless Personal Area Network, such as 6LoWPAN—Ipv6 based LoWPAN) or any other LANs. The present disclosure may equally be applicable to personal area networks such as Bluetooth, Bluetooth LE (low energy), or any proprietary network operating, e.g. in the 2.4 GHz band. The present disclosure may provide advantages especially at high frequencies and/or at high modulation orders. It may provide an improvement in the context of cognitive radio standards (such as IEEE 802.22, IEEE 802.15).

It is noted that the present disclosure is also applicable to mobile systems such as cellular mobile systems and their different operation modes. For example, some embodiments may be applicable to communication technologies under the long-term evolution (LTE)/LTE Advanced (LTE-A) standards or in fifth-generation (5G) and beyond 5G communication systems. An example of such a 5G system may be the New Radio (NR).

Figure 1:
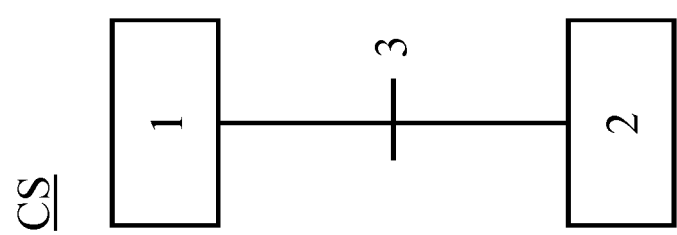
FIG. 1 is a block diagram illustrating a general model of a generic communication system.

FIG. 1 illustrates an exemplary functional communication (sub)system CS, in which 1 represents a transmitter, and 2 represents a receiver. Transmitter 1 is capable of transmitting a signal to receiver 2 over interface 3. The interface may be, for instance, a wireless interface. The interface may be specified by means of resources, which can be used for the transmission and reception by the transmitter 1 and the receiver 2. Such resources may be defined in one or more (or all) of the time domain, frequency domain, code domain, and space domain. It is noted that in general, the "transmitter" and "receiver" may be also both integrated into the same device. In other words, the devices 1 and 2 in FIG. 1 may respectively also comprise the functionality of the 2 and 1. The transmitter 1 and receiver 2 may be implemented in any device such as base station (eNB, AP) or terminal (UE, STA), or in any other entity of the communication system CS. A device such as a base station or terminal may implement both 2 and 1. The present disclosure is not limited to any particular transmitter 1, receiver 2, and/or interface 3 implementations. However, it may be applied readily to some existing communication systems as well as to the extensions of such systems, or to new communication systems. Exemplary existing communication systems may be, for instance, the 5G New Radio (NR) in its current or future releases, and/or the IEEE 802.11 based systems such as the recently studied IEEE 802.11be or any of the above-mentioned systems, or the like.

In general, communication systems may suffer from a wide variety of impairments. For example, hardware may introduce some intermodulation and amplifier distortion, local oscillator, and quantization loss. Most of the designers rely on simplified closed-form models. However, these models do not accurately or holistically capture the effects of real-world systems and channels, and they cannot estimate multiple RF impairments at the same time since it is a very complex problem. For this complex problem, deep learning (DL)-based methods are highly promising. In some embodiments of the present disclosure, a DL-based model may be used as a one-step method, which can estimate multiple RF impairments jointly. This approach comprises two stages called training and testing. In the training stage, the received signal is fed as an input and known impairments as an output to the DL model to train the DL model. Then, in the testing stage, a received signal is fed to the trained DL model, and the trained DL model finds all imperfections.

In general, with trainable models, there may be several phases involved. FIG. 2 shows these phases. In the first phase 10, the data set for training the trainable model(s) is acquired. The training set may be obtained by controlling the introduction of impairments into a signal and measuring the received signal after passing some channel or channel model or noise or the like. Then the introduced impairments (corresponding to a ground truth) and the measured signal forms the training pairs for the training set. It is noted that the present disclosure may be used with supervised learning or with unsupervised learning or with reinforcement learning. In the second phase 20, the trainable model(s) is/are trained by inputting the training data set acquired in phase 10. In the third phase, the trainable model(s) is/are tested 30. Testing 30 enables evaluating the accuracy of the model. If the accuracy is not sufficient, step 20 and possibly also may be repeated. The fourth phase 40 is the production phase (also called inference phase) in which the trained model(s) is/are employed for the impairment detection.

Such an approach may enable to consider that the impairments have a correlation between them. The existence of the impairments should be detected by experts or some tools since it is needed to learn which estimation models should be used. Therefore, multiple RF impairments should be estimated with a single model. One of the goals of the present disclosure is to estimate impairments. Once the impairments are detected/recognized, the information may be used for various purposes. Accordingly, some embodiments comprise compensation for the detected impairments (at the transmitter or the receiver). Some embodiments comprise applications of the detected impairments for authentication of users or for other security relates issues. It is noted that the impairment detection of some embodiments may be used with any of the well-known approaches for compensating impairments. Moreover, the impairment detection of some embodiments may be used with any of the well-known approaches for determining whether the user is legitimate (authenticated) or not based on the detected impairments.

FIG. 3 illustrates an overview of a multi RF impairment estimation using a deep learning (DL) model according to an embodiment of the present disclosure. In this embodiment, a one-step solution to estimate multiple impairments in the system is provided, using the DL model. In FIG. 1, transmission signal Tx is impaired with RF impairments 102 and 103 and transmitted over a channel 110 and becoming thereby a received signal Rx. Then the received signal Rx is fed to a DL module 120, which is used to estimate the impairments and to output the estimated impairment sources 125. If the estimation by the DL module 120 is correct, then the estimated impairment sources 125 correspond to the RF impairments 102 and 103. These advances make it possible to design more robust and better performing communication systems.

According to this embodiment, a method is provided for estimating radio frequency transmission impairments. The method comprises obtaining a signal Rx received over a wireless channel 110. The obtaining step may comprise or be, for instance, a reception step. However, the step may also comprise merely obtaining the received signal Rx over an interface to a device that performed the reception. The method comprises a step of processing the obtained signal Rx by a machine learning module 120 trained to distinguish N sources of impairments by applying supervised learning. Here, N is an integer larger than one. The method further comprises a step of outputting from the machine learning module 120, for each source j of the N sources, a contribution of the j-th source of impairments to the obtained signal. It is noted that the N sources are not necessarily any possible sources. N is the number of the sources for which the trainable module 120 was trained.

The machine learning module may comprise or be a trained (trainable) module, in general. The contribution may be any indicative of the presence and/or quantity of a specific impairment type (j-th). According to an exemplary implementation, the contribution indicates one of the presence or absence of contribution from a (j-th) source of impairment to the received signal. In other words, the contribution is indicated binary.

In the method mentioned above, the step of processing the obtained signal may further comprise the step of obtaining a feature vector which comprises an element for each source j of the N sources, the element indicating a degree of contribution of the j-th source of impairments to the obtained signal. The following step comprises comparing whether each j-th element of the feature vector exceeds a threshold. In some embodiments, the threshold can be different for different elements of the feature vector. The elements represent respective different types of impairments. Thus, there may be a threshold vector, corresponding in dimension to the feature vector. However, the present disclosure is not limited thereto, and in some embodiments, the threshold may be the same for all elements. After thresholding, the next step is, for each j-th element, setting the contribution of the j-th element to TRUE in case the j-th element exceeds a threshold, and setting the j-th element to FALSE otherwise. The value TRUE indicates the presence of the j-th type of impairment (out of the N impairments) in the received signal Rx and FALSE indicates the absence of the j-th type of impairment (out of the N impairments) in the received signal Rx.

However, it is noted that the present disclosure is not limited to outputting a binary value. Rather, in an exemplary implementation, a non-binary value is output, which may be the feature vector. The feature vector may undergo some further processing such as quantization with more than 2 possible levels (the above-mentioned thresholding may be seen as a quantization with 2 levels). For example, in a possible implementation, the contribution of the j-th source of impairments to the obtained signal indicates a degree of the contribution which may take one of M values, M>2. The step of processing the obtained signal outputs a feature vector which comprises a j-th element for each source j of the N sources, the j-th element indicating the degree of contribution of the j-th source of impairments to the obtained signal.

Obtaining Training Data Set 10

Figure 5:
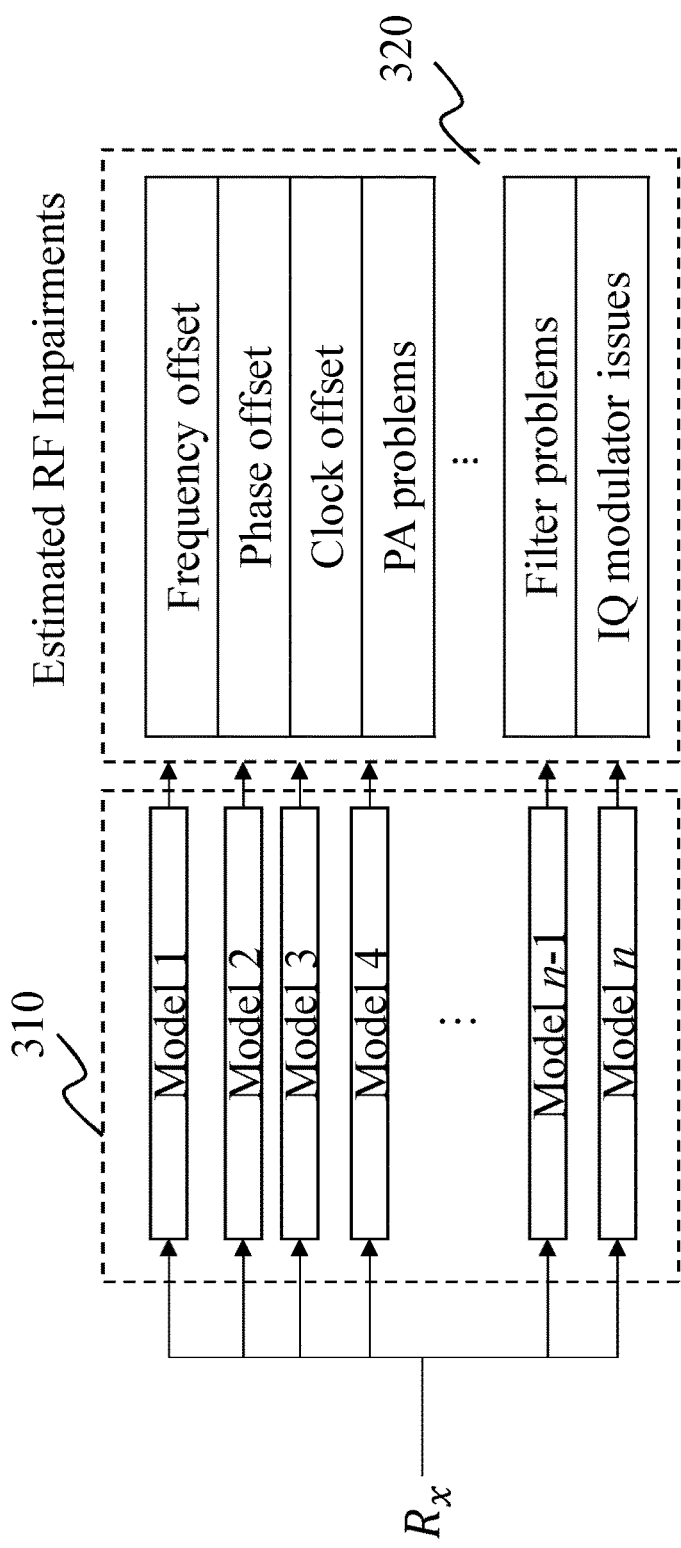
FIG. 5 is a functional diagram of an output of training data obtaining phase.

The above-mentioned method belongs to phase 40, inference, shown in FIG. 2. In the following, the training set data preparation phase 10 of FIG. 2 is briefly exemplified. A simple scenario is shown in FIG. 4. In the system mode of FIG. 4, transmission signal Tx is transmitted and affected by RF impairments 202 and 203. The resulting affected transmission signal is transmitted over channel 210. Then, the received signal Rx is captured at a receiver. Afterward, some specific impairments are detected, e.g., by some model-based method or by means of any single impairment detection method. The detection is illustrated in FIG. 5 by the separate models 1 to N representing a detection modular 310. Model 1, model 2, etc. can comprise or be conventional models which are known from the literature, e.g., for detecting a certain single type of impairment. Also, each model 1 to n can comprise or be a deep learning model. Besides that, these models can comprise or be machine learning models since they may be specifically designed to solve only one problem, e.g. to reliably detect one kind of impairment. Any of model 1, model 2, etc. can estimate more than one RF impairment in the training stage. A model (one of 1 to n) may, for instance, estimate the presence of a combination of two or more impairments.

The impairments may comprise or be any impairments such as frequency offset, phase offset, clock offset, power amplifier problems (such as non-linearities), filter distortions, and/or IQ modulator issues or the like. Then, these estimated values are stored as a vector 320. This process is illustrated in FIG. 5. Correspondingly, the received signal Rx from which these values 320 are obtained from, is stored as the input. These processes are repeated until sufficient amount of input-output (Rx, 320) pairs of the dataset is generated. The desired or appropriate size of the dataset may be determined according to the system requirements such as system performance (quality of impairment recognition), computational complexity, and/or memory.

Figure 6:
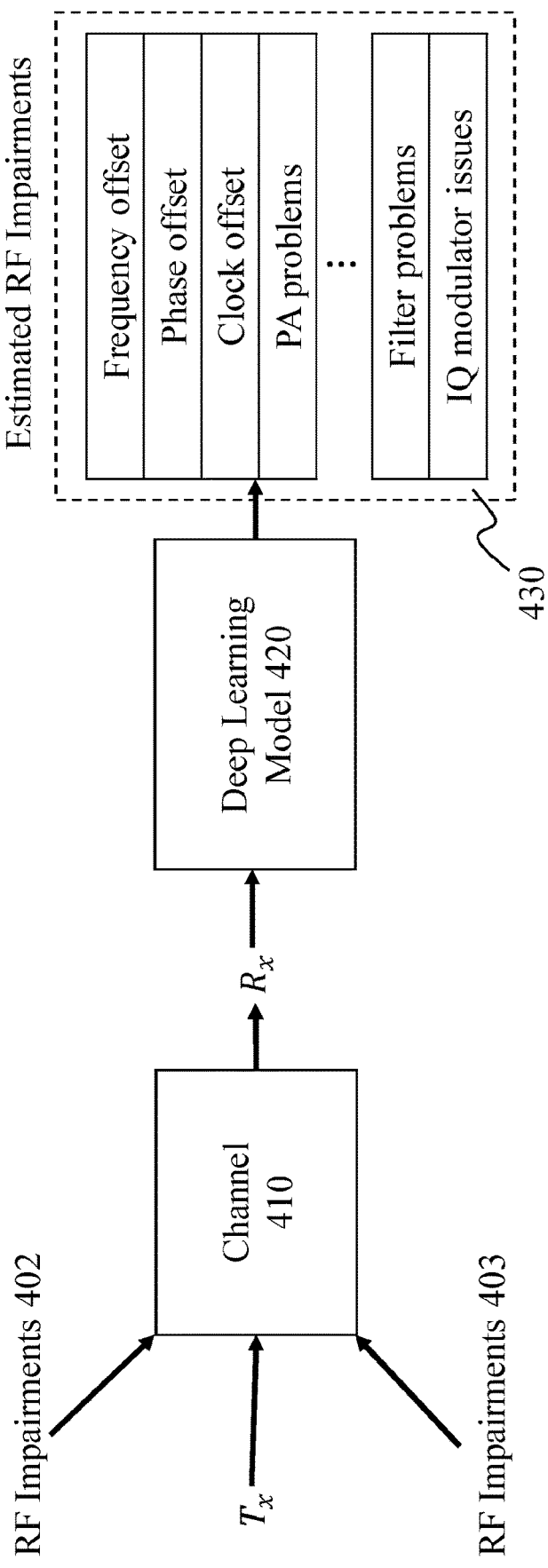
FIG. 6 is a functional diagram of an exemplary training phase.

The training data set obtained in phase 10 may be used for training phase 20. The trained model may then be used for testing 30 or inference 40. FIG. 6 illustrates the training phase 20 in which the deep learning module 420 is trained.

In FIG. 5, the determination of the impairment indication indicating the type and/or parameters of the impairment was performed by an impairment-specific model or by an already trained and tested model or by some non-trainable approaches. However, the present disclosure is not limited to any particular obtainment of the training data set. In general, the obtaining of the training set may comprise, for each training data in the training set, the steps of generating an input signal Tx, determining the impairment indication indicating the type and/or parameters of the impairment; impairing the input signal with the impairment, and obtaining signal Rx impaired by the impairment and a transmission channel by transmitting the impaired input signal over a wireless channel and receiving the transmitted signal. In general, the impairment(s) sources may be simulated. For example, there are simulators or simulating software which may enable to generate impairment(s) with known parameters (amounts) and then impairing a transmission signal therewith and performing or simulating transmission via a channel. In such cases, the training dataset pairs are formed by the known impairments (and possibly their amount) as output (ground truth) and the resulting received signal as input to the trainable model.

The obtained received signal Rx is then stored together with an impairment indication for use as a training set. The impairment indication may be an index or a name or any representing assigned to a particular impairment type recognizable by the model to be trained. The impairment indication may comprise the amount of impairment. As a specific example, the impairment indication may comprise impairment types such as frequency offset and the amount of the impairment such as the value of the frequency offset. The present disclosure is not limited to cases in which both the impairment type and impairment amount is detected. The present disclosure provides embodiments in which only the impairment type is detected, as well as embodiments in which both the type of impairment and the amount of the impairment are detected. It is noted that the transmission over channel 210 may be simulated. In such simulation, the channel may be represented by a certain mathematical model, or obtained by simulating actual transmission conditions. The provision of data from the real system, however, may help training the DL model more efficiently for practical use.

The training set may comprise pairs of input (received signal) and output (impairments involved) generated with various combinations of two or more impairments among the distinguishable impairments (impairment sources). This may improve the model performance any enable to exploit correlations between different impairments.

Training 20

Phase 20 of DL model training is illustrated in FIG. 6. A method may be provided for training a machine learning module 420 for estimating radio frequency transmission impairments 402, 403.

The method comprises obtaining a training set comprising plural training data comprising input signal impaired by the impairment and by a transmission channel Rx, and an impairment indication indicating the type of the impairment 320. The obtaining of the training set may be, for example, reading of the training data from a memory or storage of any kind. The obtaining may also correspond to obtaining described above with reference to FIG. 5. The method may further comprise inputting the training set into the machine learning module 420. In other words, the pairs of the received signal and the ground truth of the detected impairments comprised in the received signal are provided to the machine learning module 420. What follows is the step of adapting parameters of the machine learning module according to the machine learning using the inputted training set. Finally, the adapted parameters of the trainable model are stored for use in said estimating radio frequency transmission impairments.

FIG. 6 shows exemplarily a deep learning module 420. However, it is noted that in general, the module can comprise or be a machine learning module, or simply a learning module. In other words, the present disclosure is not limited to the deep neural network used for impairment detection. Any model-based approach may be employed. Deep learning refers to trainable models comprising more than one layer. Machine learning refers to trainable models with any structure comprising the layer structure applying one single layer or more layers. The models may be embedded in functional and/or physical modules. Accordingly, when referring herein to a trainable module or a learning module, what is meant is a functional module which implements a trainable model such as machine learning or deep learning or other kinds of models. The trainable models may comprise or be neural networks or other kinds of trainable models. Here, for instance, a multi-layer perceptron (MLP), a long short-term memory (LSTM), a convolutional neural network (CNN), or their variants or combinations can be used as the deep learning 420.

The machine (trainable model) is trained 20 with the dataset created in the training stage 10. The training may be performed, e.g., by supervised or unsupervised learning. During the training, the trainable parameters of the trainable model 420 are adapted based on a difference between the actual output 430 of the trainable model and the desired output 402, 403 of the trainable model. The desired output may comprise or be for a certain received signal Rx the associated impairments (ground truth) in the training data set. There are many possibilities for learning. In some embodiments, the adaptation of the parameters is performed by backpropagation. Backpropagation has been known from the literature and widely used. However, the present disclosure is not limited thereto, and there are alternative techniques for backpropagation. For example, alternative approaches such as Difference Target Propagation, HSIC (Hilbert-Schmidt Independence Criterion), Online Alternating Minimization with Auxiliary Variables, or Decoupled Neural Interfaces Using Synthetic Gradients, or the like may be used.

In the training stage, before the model is trained, the model may be configured. Parameters of the model or of the learning algorithm which may be set but are not trainable are referred to as hyperparameters. Hyperparameters may be optimized considering the performance accuracy and complexity. In particular, a hyperparameter is a parameter whose value is used to control the learning process. By contrast, the values of other (trainable) parameters (typically node weights) are derived via training. Hyperparameters can be classified as model hyperparameters, that cannot be inferred while fitting the machine to the training set because they refer to the model selection task, or algorithm hyperparameters, that in principle have no influence on the performance of the model but affect the speed and quality of the learning process. An example of a model hyperparameter is the topology and size of a neural network. Examples of algorithm hyperparameters comprise or are learning rate and training batch size.

It is noted that the training may be performed based on a training set with a predetermined number of training pairs. However, the training may be alternatively performed/stopped based on convergence criteria. For example, the training may stop, if the improvement of the model upon feeding new training data is lower than a certain threshold. Or, the training may stop if the difference between the output of the model and the desired output (possibly in average or median or the like over a plurality of training data pairs) is lower than a predetermined threshold. Such thresholds may also be considered as hyperparameters.

The trained parameter (e.g., weights of the neural network model) are stored and the trainable model is configured by these parameters in the testing and/or inference phase. Once the training is done (training stage), the testing stage may start. The testing stage 30 is functionally similar to the inference phase 40.

In FIG. 6, channel 410 is shown as an additional impairment source. It is noted that the impairments introduced by the channel may also be detected/recognized in some embodiments. For example, during the training phase, impairments caused by the channel may be trained with the other impairments and then recognizable. However, the present disclosure is not limited to such an approach. Rather, the channel may be merely considered as a kind of noise with unknown impairments/characteristics.

Testing 30 and Inference 40

Figure 7:
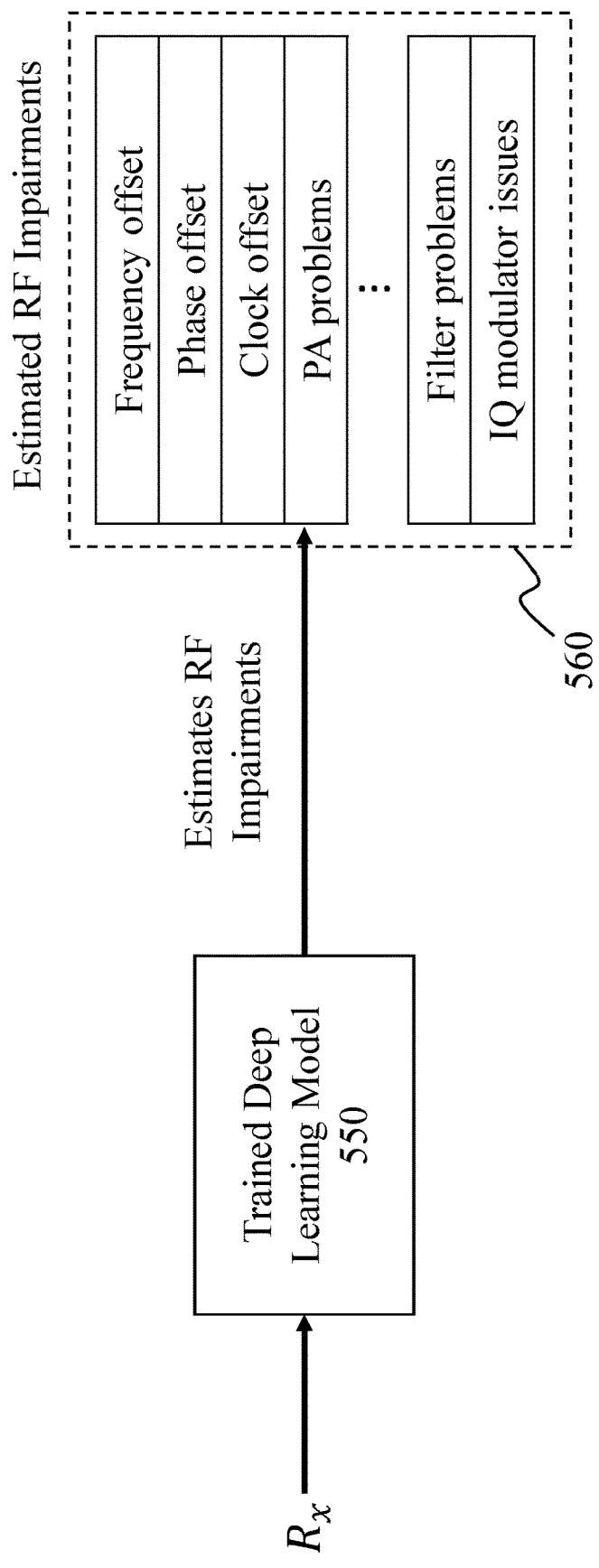
FIG. 7 is a functional diagram of an exemplary testing/inference phase.

The testing stage is illustrated in FIG. 7. In this stage, the signal Rx is received, and it is fed to the trained DL model 550. After that, the DL model 550 can estimate the RF impairments 560 within a single stage. In the testing phase, the trained model may be tested with some Rx signals that were not part of the training set but for which the impairments are known. For example, a testing set may be obtained similarly to the training set. The performance of the model 550 may then be tested, e.g., in terms of accuracy, i.e., in how many cases the trained model 550 correctly identified the impairments 560. The testing may concern impairment presence identification and detection of the amount of the impairment. In the testing phase, if the results (performance of the trained model) are not satisfactory, the training may be continued or some hyperparameters may be modified and the model may be (newly) trained again, e.g., with the same or different training set.

In the inference phase, the trained model is employed for detection (recognition of the presence and/or quantification) of the impairments.

Exemplary Implementations and Variants

As described above with reference to FIG. 3 and other figures, embodiments of the present disclosure provide methods and apparatuses for detection (estimation) of impairments involved in the transmission chain (transmitter side, channel, receiver side) of a wireless communication system (e.g., such as the one shown in FIG. 1).

As mentioned above, the present disclosure is not limited to any particular trainable model. There is a variety of ML and DL techniques that can be employed. In some embodiments, machine learning comprises one or more types of machine learning methods comprising a multi-layer perceptron, long short-term memory, and/or convolutional neural network. For example, at least two of the N sources of impairments may be processed by different types of machine learning methods. For example, since some of the single-carrier and multi-carrier impairments are different, different models can be used for each of them (two different DL models). In other words, single-carrier signal source impairments may be detected by a trainable model different from the trainable model used to detect impairments from a multi-carrier signal source. Although some of the RF impairments of single-carrier and multi-carrier are similar, RF impairments or their effects may change for these two waveforms. Therefore, the signals in the training dataset may be divided into a single carrier and multi-carrier. The training is performed separately for the single-carrier and for the multi-carrier signals, thereby obtaining two separate trained models. Afterwards, RF impairments are trained by a deep learning (DL) algorithm to learn single-carrier RF impairments and the other DL algorithm to learn multi-carrier RF impairments. The received signal in the testing stage or inference stage is at first identified as either a single-carrier or a multi-carrier signal. If the signal is multi-carrier, the model that is trained with multi-carrier waveforms is used to estimate the multiple RF impairments, and if the signal is a single-carrier signal, the model that is trained with single-carrier waveforms is used to estimate the RF impairments.

In the above example, two different models were used for single-carrier and for multiple-carrier signals respectively. An additional model may precede processing by such specialized models to distinguish whether the received signal is a single-carrier signal or a multi-carrier signal. According to the result of the distinction, the signal is then inputted to the corresponding single-carrier trained model or to the multi-carrier trained model for impairment detection.

The (training or testing) dataset can be created, for instance, with MATLAB or a similar simulator program. In that case, there would be no need for estimating the impairments by a model or ML-based methods. This is because the impairments created in the simulations can be known. These known impairments can be used in the training stage and the trainable model can be trained according to them. In the testing stage, the received signal that is going to be estimated is fed to the trained DL algorithm as described above.

The advent of deep learning is to alleviate the need for human-based feature extraction/crafting/engineering. Thus, it is possible to apply the above method directly to real-world measurements without doing any feature extraction. Conversely, the "deep" attribute (number of layers) of the used machine learning may be reduced at the cost of adding more feature extraction. In an extreme case, one may completely avoid deep learning and use machine learning if it is possible to extract distinctive features to estimate multiple RF impairments. The stage that feature extraction can be made is illustrated in FIG. 6.

Figure 8:
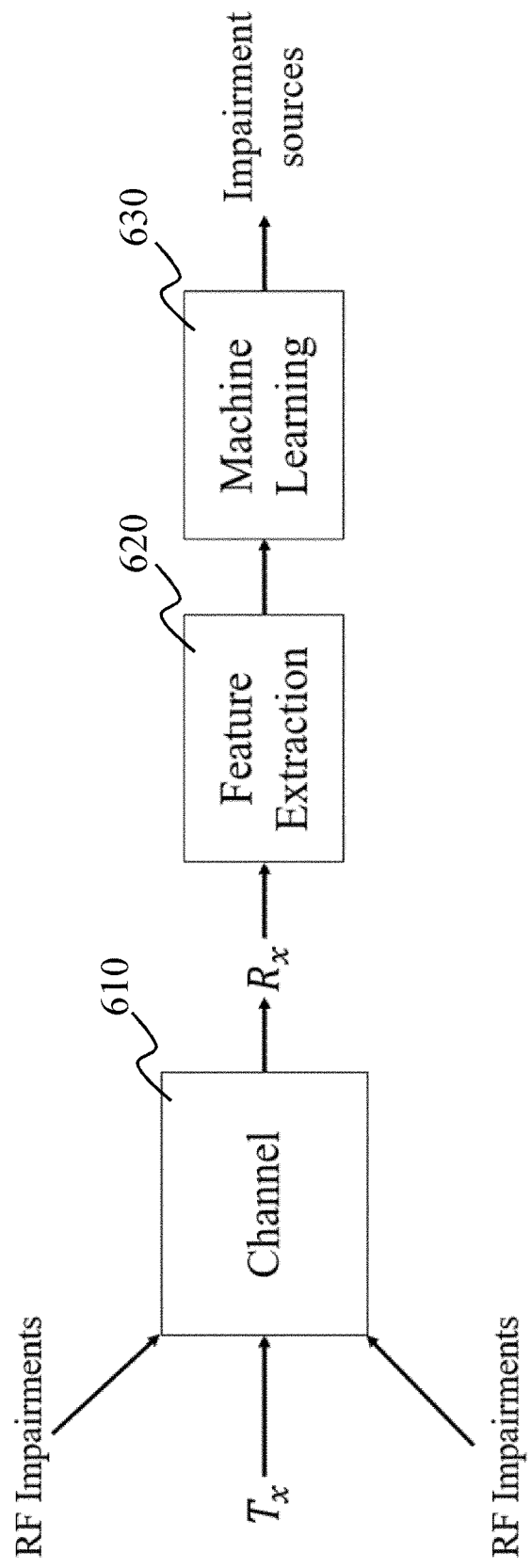
FIG. 8 is a functional diagram of a multiple RF impairment estimation using a machine learning model with feature extraction.

FIG. 8 shows an overview of such multiple RF impairment estimations using a machine learning model with feature extraction. After obtaining received signal Rx from channel 610, the feature extraction module 620 extracts certain features. Some feature(s) of the signal can be learned and these feature(s) may be fed to the trainable module as an input. It is noted that in some embodiments, these features may be fed to the trainable module jointly. For example, the features may comprise (but are not limited by) one or more of an Error Vector Magnitude (EVM), Complementary Cumulative Distribution Function (CCDF), Constellation, or the like. An error vector is a vector in the I-Q plane between the ideal constellation point and the point received by the receiver. In other words, it is the difference between actual received symbols and ideal symbols. The root mean square (RMS) average amplitude of the error vector, normalized to ideal signal amplitude reference, is the EVM. EVM may be expressed in percent by multiplying the ratio by 100%. The term "constellation" here refers to the modulation constellation.

It is possible, e.g., to observe the spectrum before and after the power amplifier and observe the spectrum regrowth in this way. Such spectrum regrowth may represent a feature to be extracted. These are only examples, and, in general, any other features which may be known from the prior art can be extracted. After feature extraction, the machine learning module 630 recognizes the impairment based on the extracted features.

The existence (presence or absence) of RF impairments can be represented by binary numbers such as 1 and 0 rather than finding their numerical values (amount of the impairment). For example, the output could be represented as 1 in the case of impairment existence and as 0 in the case of non-existence. In other words, the regression problem here has been turned into a classification problem. By such classification, the existence of the impairments in the received signal can be found. After the estimation of RF impairment existence, the numerical value of the RF impairments can be found in another way. For example, it is possible to find the amount of the impairments by some conventional methods or by specifically trained modules for particular specific impairment. In other words, the trainable module may be a classifier which detects the presence or absence of an impairment or a combination of impairments in the received signal.

Some embodiments of the present disclosure may be used to learn the existence of the RF impairments while finding their numeric value at the same time. Thus, the trainable module is trained to find the amount of each impairment in the received signal. For example, after the impairments are found, if the found value (amount of certain impairment) is higher than a threshold, this impairment is assumed to exist (be present). If the found value (amount of certain impairment) is lower than the threshold, this impairment is assumed not to exist (be absent).

One of the advantages of the present disclosure is that RF impairments are not limited to the above-mentioned ones. It is possible to estimate impairments, for any kind of imperfection in the system, without changing the architecture by training the network accordingly, especially in the case of deep learning-based implementations. The present disclosure does not have to be applied to all possible impairments. It can be applied to a certain group of selected RF impairments which can then be estimated with the proposed method. The remaining impairments may be considered to represent some noise of the system or may be detected by using another method.

Figure 9:
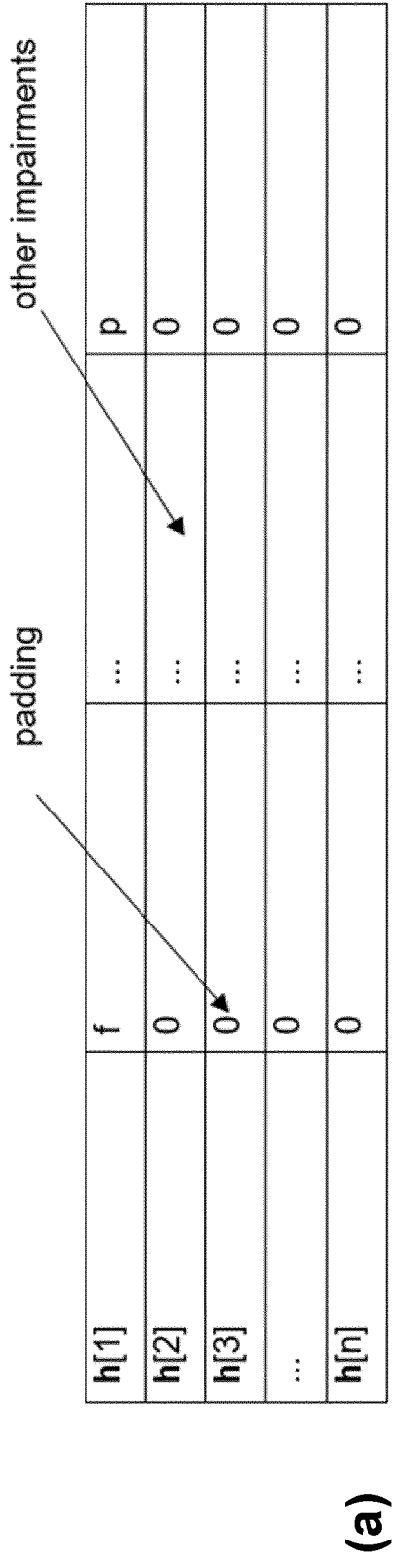
FIG. 9 is a schematic drawing illustrating exemplary output formats for outputting contribution of different impairment sources.
Figure 9:
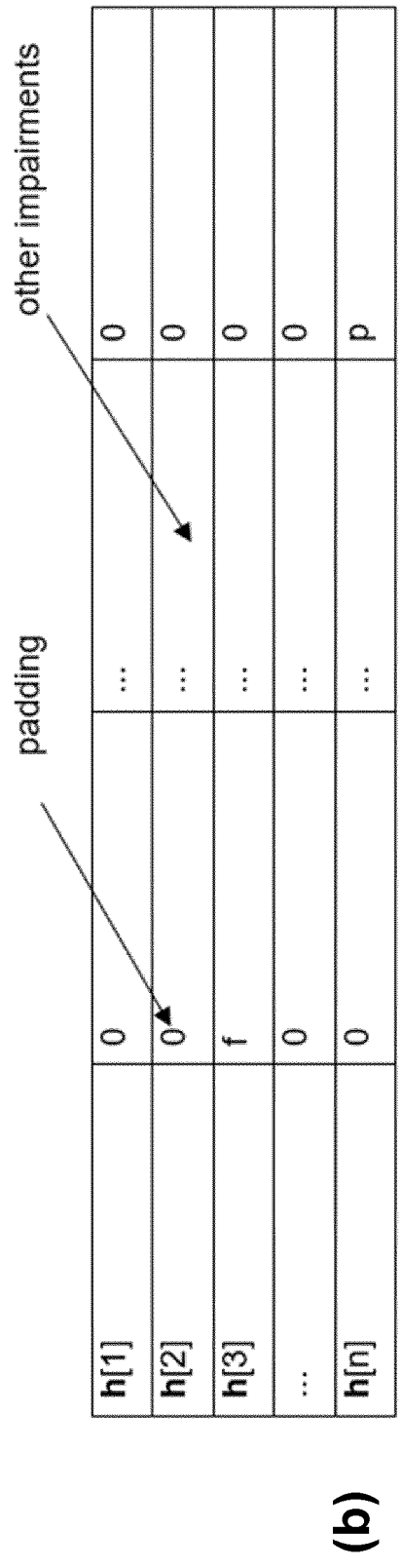

The output of the impairment detection may be a vector or a matrix according to impairments to be detected. For instance, channel characteristics may be a vector. On the other hand, each of the frequency offset and the phase offset may be a value. Together they can be represented in the output in various manners. For example, the channel vector, the frequency offset, and the phase offset may be stacked into a vector. Such vector has the length (in terms of a number of elements) of the channel vector plus two (for the frequency offset and the phase offset values). However, the present disclosure is not limited to such a form of output. FIG. 9 illustrates some alternative exemplary output formats. Format (a) is a matrix in which there is a column per impairment source. The first column corresponds to the channel vector, the second column comprises the value f (frequency offset) at a predetermined (here the first) row position, and the last column comprises the value p (phase offset) at a predetermined (here the first) row position. In between, there may be further (other) impairment sources represented by vectors or values. Format (b) is similar to format (a), with the difference in the predetermined row position for the values f and p. In order to fill the unused rows in the columns in which only a value such as f and p are comprised (or vectors shorter than the number or matrix rows), padding may be used. In this example, the padding is performed by inserting zeros. It is noted that instead of a column, there may be a row per impairment source. In general, it is conceivable to provide tensor representation, e.g., in case an impairment source is represented by a matrix or a tensor. Alternatively, any matrix or tensor may be vectorized.

The detected impairments can be used for various different purposes such as receiver-side compensation, pre-distortion, and/or for physical layer authentication (PLA).

Correspondingly, the method applied at a signal receiving side may further comprise a step of compensating the obtained signal based on the outputted contribution of the j-th source of impairments to the obtained signal.

Figure 10:
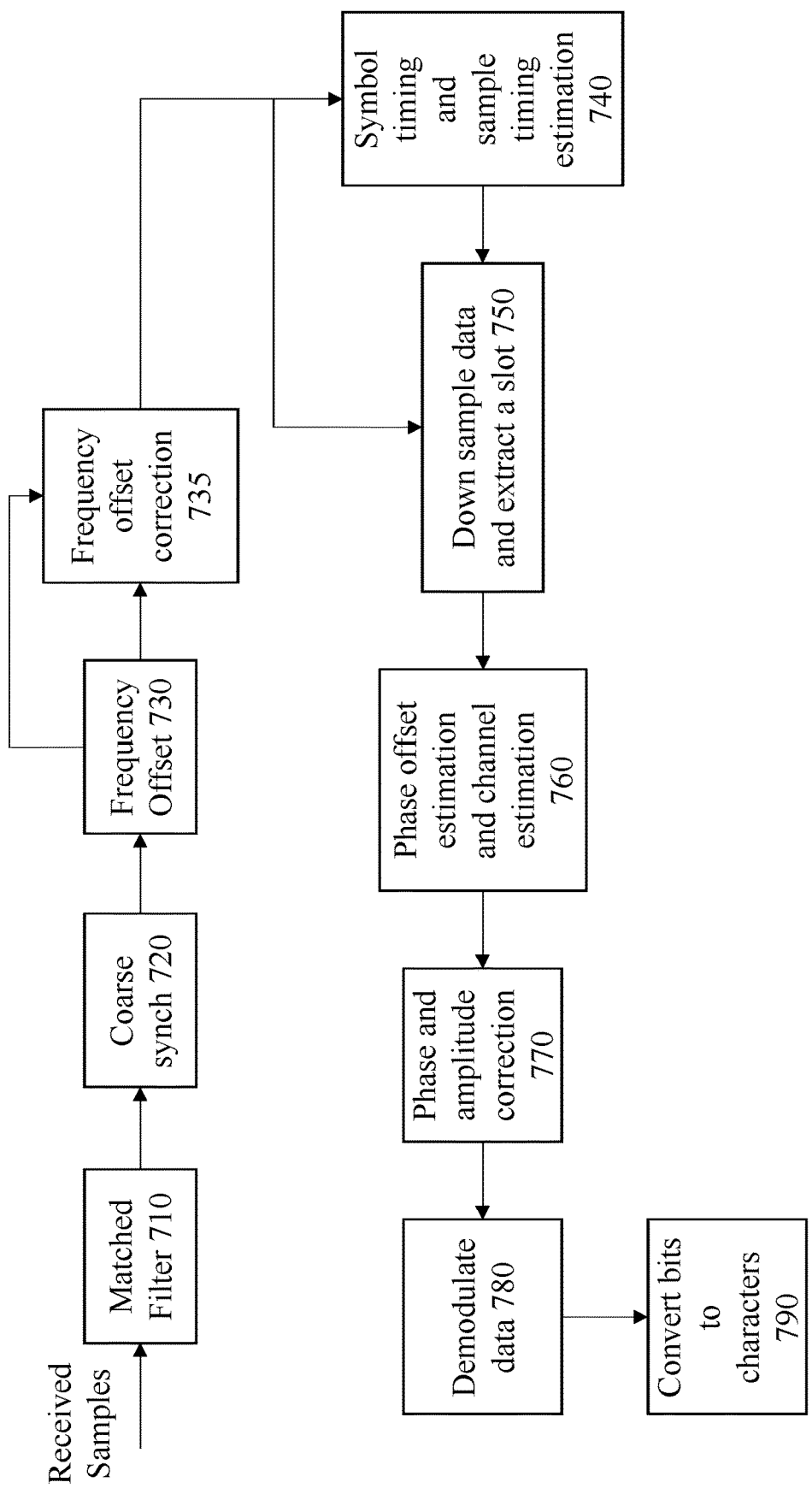
FIG. 10 is a block diagram is a block diagram illustrating an example for a single-carrier synchronization.
Figure 11:
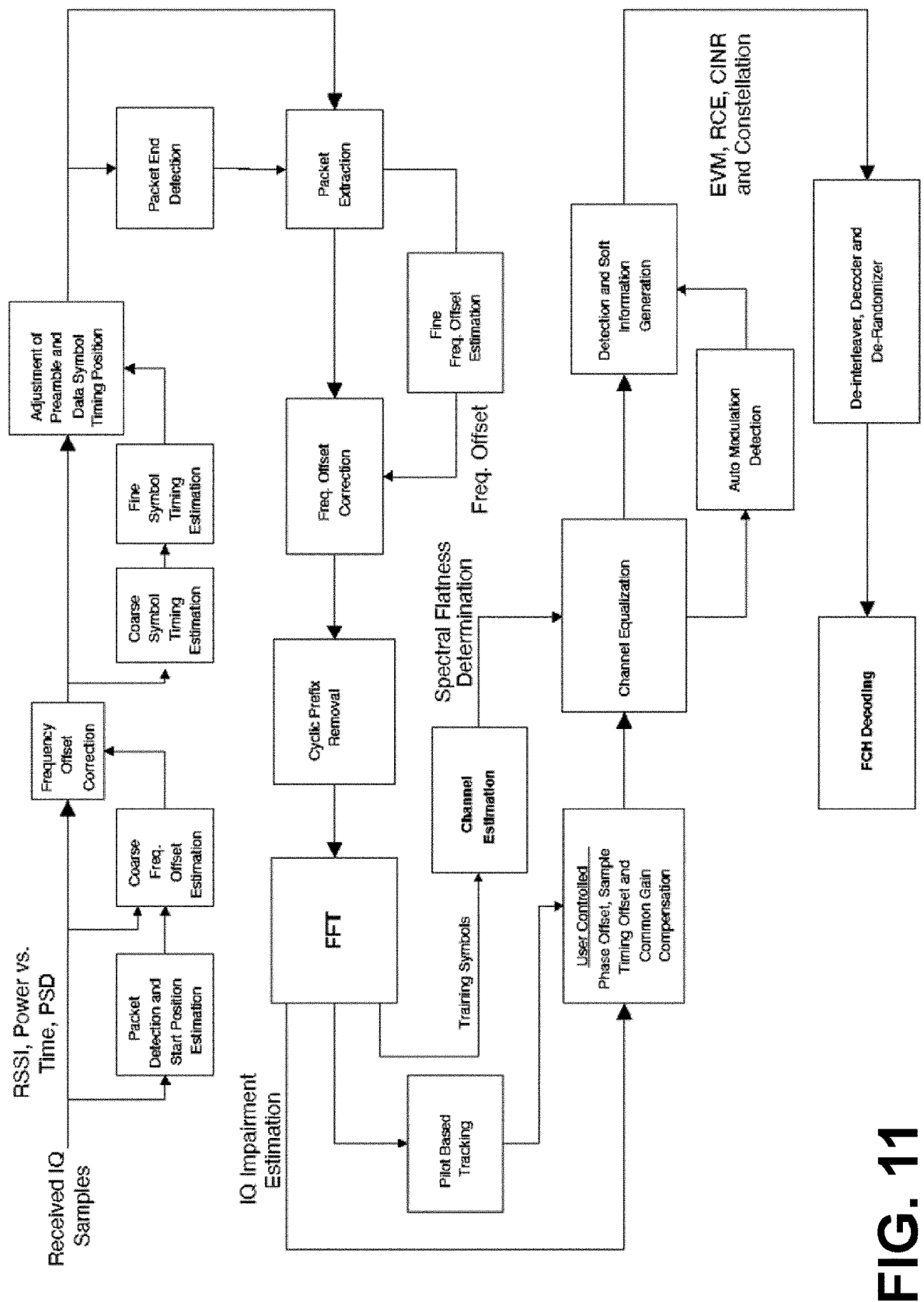
FIG. 11 is a block diagram is a block diagram illustrating an example for a multi-carrier synchronization.

After estimating the multiple RF impairments, the effects of these impairments can be removed from the signal, which is referred to as compensation. It is noted that a complete removal may not be possible, but the compensation may at least reduce the amount of a certain impairment or a combination of impairments from the received signal. Consequently, such a signal may be then decoded with a higher likelihood of correct decoding. As an example, let us assume that there is only a phase offset in the system. For single-carrier systems, data is downsampled and the downsampled data is divided by phase offset to compensate for its effect. When the multiple impairments are found using the trained model as described above, an inverse process to the process of introducing the impairments into the transmission signal can be applied for compensation. Compensation of the RF impairments may be important for synchronization. For example, FIG. 10 is a block diagram illustrating an example for a single carrier synchronization. FIG. 11 is a block diagram illustrating an example for a multi-carrier synchronization.

As can be seen in FIG. 10, first data is downsampled and then phase offset is removed. In particular, FIG. 10 illustrates steps/functional modules (units) of an exemplary single-carrier receiver. After sampling and analog to digital conversion, sampled (digital) received signal is obtained. In step 710, a matched filter may be applied to the received digital signal to one or more channel paths. In step 720, a coarse synchronization may be performed based on the detected channel. The detection in step 710 is typically performed based on some synchronization signal (preamble), known (at least partly) to the transmitter as well as to the receiver. In step 730, the frequency offset is obtained and in step 735, the frequency offset is compensated for. The frequency offset may be obtained by the above-described impairment detection. In step 740, symbol timing and sample timing estimation is performed. In step 750, the downsampling is performed and a desired time slot is extracted. A phase offset estimation and a channel estimation are performed in step 760 and may be performed by the above-described impairment detection jointly, and possibly, jointly with the frequency offset estimation of step 730. According to the estimated channel and phase offset, in step 770 a correction is performed. In step 780, the compensated signal is demodulated and in step 790 the demodulated signal is converted to data. The data may be specified in terms of bits, bytes or characters, depending on the layer specification (standard). Here, a byte refers to 8 bits and a character corresponds to one or more bytes, e.g. depending on the hardware/software architecture.

FIG. 11 is a block diagram illustrating an example for a multi-carrier synchronization. The block diagram shows steps/functional modules of an apparatus. As can be seen in the figure, the received complex-valued (IQ) samples are input to the processing. Based thereon, the start of packet is detected, a coarse frequency offset estimation is performed and the frequency offset is corrected accordingly. Then, the timing estimation is performed and the preamble and symbol timing is adjusted accordingly. Then, the end of the packet is detected and the packet is extracted. Next, a finer frequency offset is estimated and corrected. Then, the subcarrier demodulation is performed. For example, the cyclic prefix may be removed and Fast Fourier Transformation (FFT) may be applied to obtain subcarrier modulation symbols. Then, modulation (IQ) impairment may be detected and compensated for. Channel estimation may be also performed and compensated for by channel equalization. Based on pilot tracking, phase offset and further timing offset as well as gain may be estimated and compensated for. Based on the compensated frequency signal values, demodulation may be performed. The present disclosure is not limited to any particular demodulation. For example, detection outputting soft information may be used, or the detection may directly output hard values. Further baseband processing may comprise de-interleaving, decoding, and the like. In the example of FIG. 11, the frame control header (FCH) is decoded.

In the stages of FIGS. 10 and 11, any one or more (or all) of the impairments may be estimated using the impairment detection described in the embodiments and examples of the present disclosure. For example, any one or more of the following impairments may be estimated in such way: the coarse frequency offset, the symbol timing, the fine frequency offset, the modulation impairments, the channel taps, the phase offset, the power gain, the sample timing offset, and/or any other kinds of impairments. It is noted that these impairments and the receiver chain are only exemplary. In other receiver architectures, other impairments may become more pertinent.

Some impairment compensation approaches are known from the art, any of them may be applied. For example, QI, Jian. *Analysis and Compensation of Channel and RF Impairments in MIMO Wireless Communication Systems.* 2011. PhD Thesis. Université du Québec, Institut national de la recherche scientifique (available at http://espace.inrs.ca/id/eprint/2160/) provides an overview of some of the approaches which may be also used with the impairment detection of the present disclosure.

According to an embodiment, the signal received over a wireless channel is received from a transmitting device 1. Then the impairment detection as described in any of the examples above is performed. The method further comprises a step of transmitting an indication of the contribution for at least one of the N sources of impairments to the transmitting device. In such a case, the compensation does not need to be performed at the receiver. For instance, the transmitting device may then proceed by receiving, at the transmitting device, the indication of the contribution for at least one of the N sources of impairments; and by applying, at the transmitting device, compensation in accordance with the received indication. Such compensation at the receiver side, before the signal is transmitted, is called pre-distortion. There are several predistortion approaches known from the art, any of them may be used. It is noted that the term "predistortion" herein is employed in a broader context of any kind of impairments. It may be alternatively referred to as "preprocessing". In general, such predistortion or preprocessing refers to an optimized transmitter and receiver design to compensate for current/upcoming RF impairments according to previous estimated RF impairments. The predistortion (preprocessing) may be applied to compensate for PAPR or to compensate for any impairment sources detected.

The effects of RF impairments on different transceivers have been examined in the literature, e.g., in JIN, Yuehai;

DAI, Fa Foster. *Impact of transceiver RFIC impairments on MIMO system performance; IEEE Transactions on Industrial Electronics,* 2011, 59.1: 538-549 or in KIAYANI, Adnan, et al. *Advanced receiver design for mitigating multiple RF impairments in OFDM systems: algorithms and RF measurements; Journal of Electrical and Computer Engineering,* 2012. After estimating the RF impairments, if any RF impairment should be removed or its effects should be reduced before they occur in the upcoming signal, an approach similar to the above-mentioned publications or other publications may be applied. In the above example regarding the pre-distortion, the impairments were detected at the receiver and compensated for at the transmitter. However, the present disclosure is not limited to such approaches. In general, certain types (or combinations) of impairments may be compensated at the receiver side and other types (or combinations) of impairments may be compensated at the transmitter. The kind of compensation may be decided based on the type (source) of impairment. Correspondingly, the indication provided from receiver 2 to transmitter 1 may comprise only the impairments which are to be handled at the transmitter side (by pre-distortion).

Multiple RF impairments may be estimated using one of the above-mentioned embodiments and examples. In the upcoming signal (next signal to be transmitted from the transmitter), it is expected to have the same or similar RF impairments. For that reason, a waveform to alleviate these effects in the receiver can be designed. For example, if the PAPR is higher among the estimated RF impairments, and if wave-shaped (such as Root-raised cosine, RRC) pulsed single carrier is used, the roll-off value can be increased in the transmitter and the PAPR value can be reduced for the upcoming signal. Alternatively, the modulation order can be reduced. In other words, the pre-distortion is not limited to compensating for the impairment by means of inverting its effects. Rather, the compensation at the transmitted may comprise changing one or more transmission parameters to improve reception based on the type of impairment detected. The effects of RF impairments can vary according to the various waveforms and different scenarios (frequency, mobility). Along this line, an optimum waveform design can be provided for the upcoming signal according to the estimated RF impairments.

As mentioned in the above examples, the sources of impairments at the transmitter side comprise one or more of the following: frequency offset, phase offset, clock offset, power amplifier impairments, filter impairments, and/or modulation impairments or other impairments.

RF Impairments may in particular comprise power amplifier nonlinearities (caused especially by high Peak-to-average power ratio, PAPR, of the signal), IQ modulator impairments (Quadrature offset, IQ gain imbalance, and/or DC offset), phase noise, frequency offset, sample clock error, noise (additive white Gaussian noise, AWGN), analog to digital and/or digital to analog (ADC/DAC) issues and/or dynamic range given by the hardware.

The present disclosure may be further used to identify and possibly to quantify channel impairments comprising one or more of dispersion of the channel, fading, interference, and/or the like.

Physical Layer Authentication

Another application of the detection of impairments by some embodiments of the present disclosure is physical layer authentication (PLA). Accordingly, after estimating the impairments, the method of some embodiments may further comprise performing a physical layer authentication based on the outputted contribution of the N sources of impairments to the obtained signal.

For employment in the PLA, the RF impairments are detected at first. Then these detected impairments are used for user authentication. Some of the known approaches for physical layer authentication (PLA) may be employed. For example, PEI, Chengcheng, et al. *Channel-based physical layer authentication. In:* 2014 *IEEE Global Communications Conference; IEEE,* 2014. p. 4114-4119, at first estimate the channel and then use machine learning (specifically support vector machine, SVM) for physical layer authentication. The first channel and/or RF impairments can be estimated with the above-described impairment estimation approach, and then a machine learning algorithm can be used for physical layer authentication. In this technique, machine learning is used as a kind of thresholding mechanism. The optimum threshold may be also decided according to true positive and false-positive rates (or learned). The above-mentioned work by PEI et al. is only an example, and the present disclosure may employ any other mechanisms which rely on estimated impairments in order to check the legal/illegal status of a certain user. One of the disadvantages of some known PLA studies is that they train their models in the training stage according to a legitimate signal. After that, they decide if the signal is legitimate or illegitimate according to the received signal. However, this is disadvantageous in the sense that they cannot provide the information on which impairment they give the decision that the signal is illegitimate. In other words, the machine gives the decision whether or not the user is legitimate or not, as a black-box, without detecting the RF impairments. In order to improve reliability, in some embodiments of the present disclosure, the previously defined impairments of legitimate users are collected and compared with the detected actual impairments to be identified according to a threshold. Then, the decision on whether the coming signal is legitimate or not is given. Thus, the trainable module can learn which impairment provides better or worse information about legitimacy or illegitimacy. Therefore, more reliable results can be obtained in terms of security perspective. This is because the machine provides information about a specific RF impairment (or impairment combination) that is different (anomalous). Such specific impairment can be further checked, e.g., by a person (an engineer) or with another method (e.g., model-based signal RF single impairment detection) and its correctness can be double-checked. This increases reliability.

Figure 12:
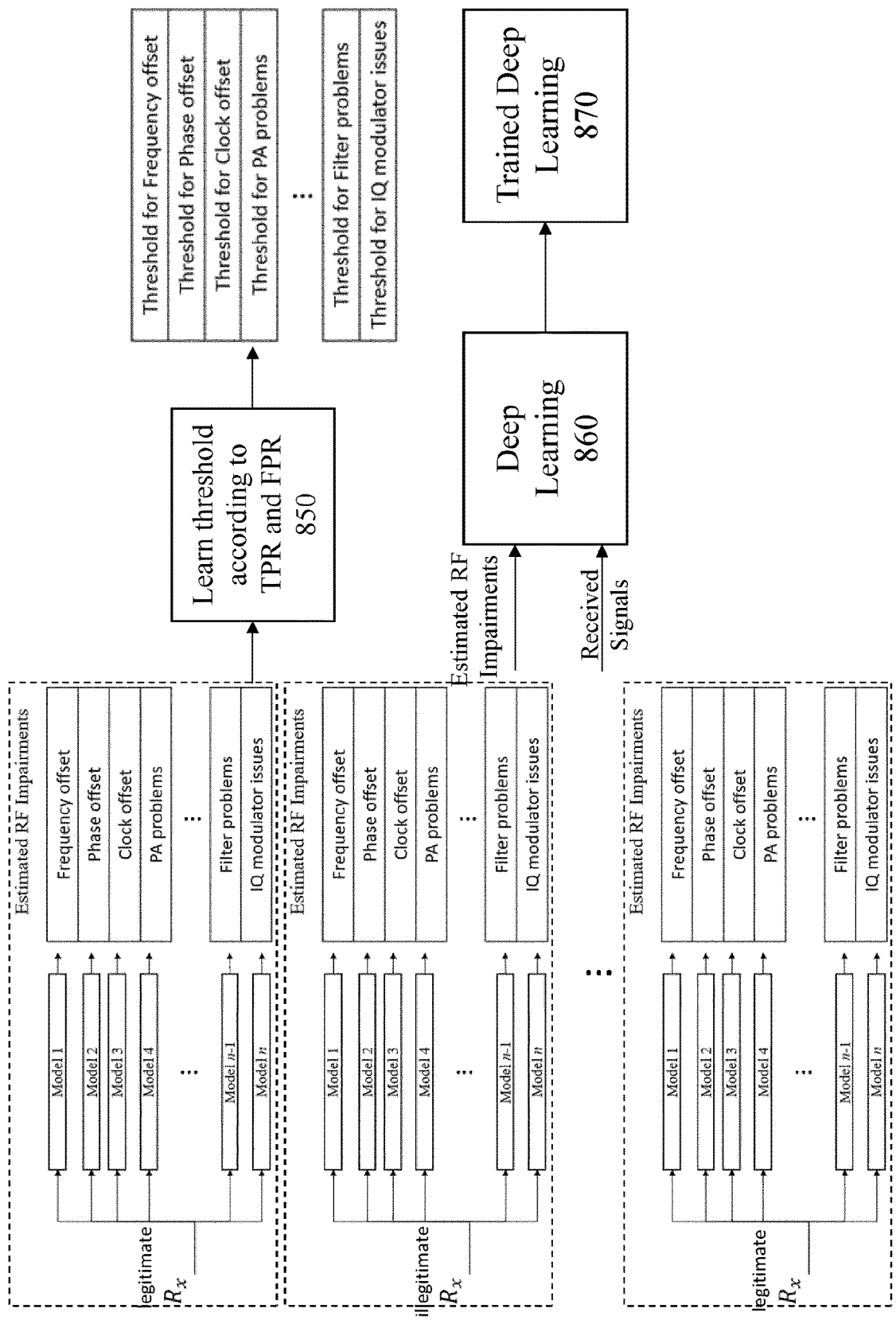
FIG. 12 is a block diagram illustrating a physical layer authentication functional modules in a training phase.
Figure 13:
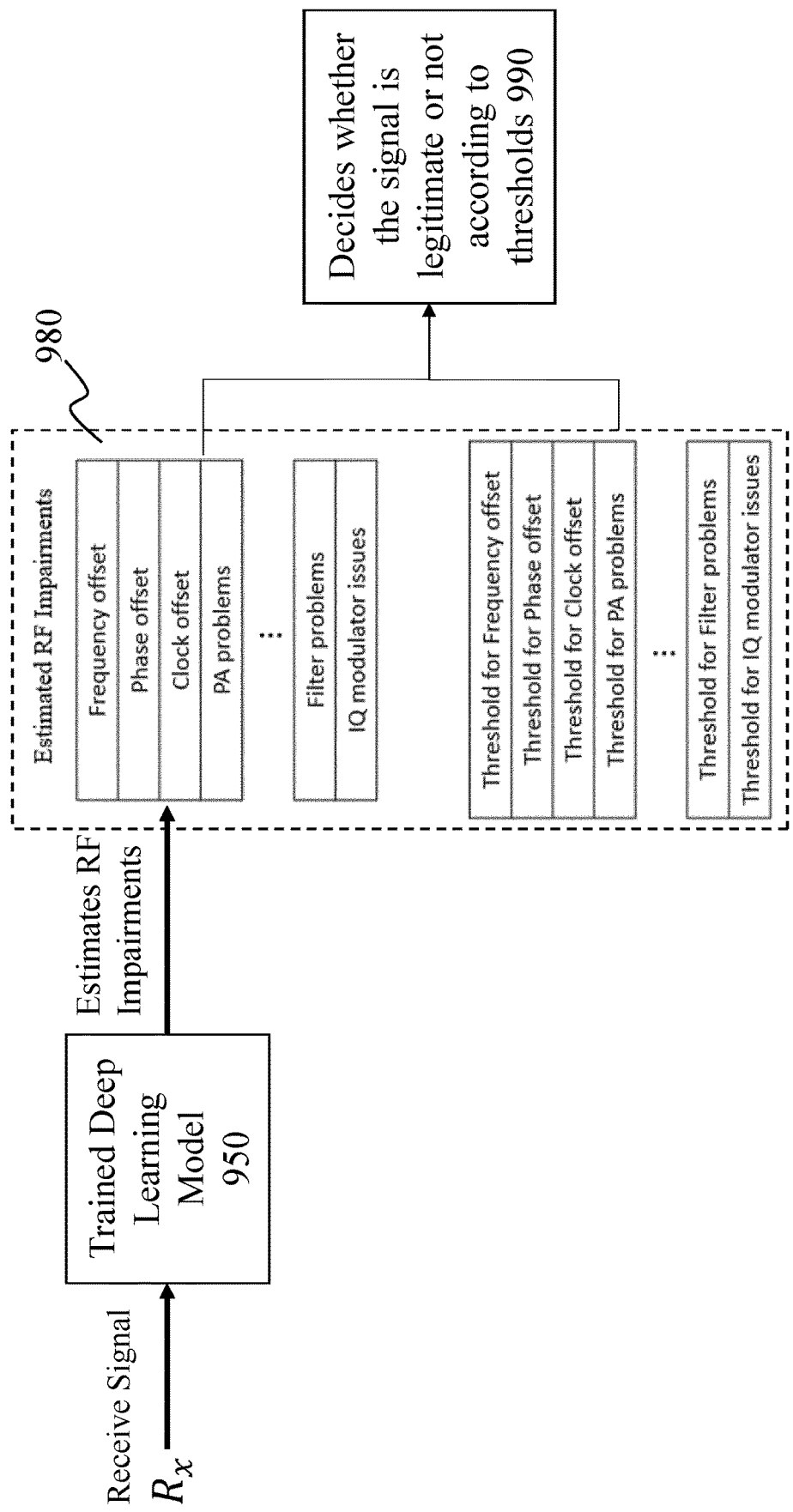
FIG. 13 is a block diagram illustrating a physical layer authentication functional modules in an inference phase.

FIGS. 12 and 13 show the PLA training and testing stages, respectively.

FIG. 12 illustrates an exemplary PLA training stage. In particular, legitimate and possibly also illegitimate training pairs are input to the trainable module 860 to train it. The legitimate training pairs comprise possible inputs (received signal) and the respective desired outputs (impairments) in case the user is legitimate. After training, trained parameters 870 of the trainable module 869 are output.

In the training stage, additionally, a threshold selection may be added to the process to identify whether the user is legitimate or illegitimate. First, multiple RF impairments are estimated and thresholds are selected according to the true positive ratio (TPR) and false-positive rate (FPR) in the threshold training module/stage 850. The optimum threshold is learned, for instance, using legitimate and illegitimate signals in the training stage as an input to learning. In the testing stage, the signal to be authenticated is received as an input. The result of the threshold learning is a set of thresholds for the respective set of impairments to be estimated.

FIG. 13 illustrates an exemplary PLA in a testing or inference stage. A received signal Rx is input to a trainable module (Trained Deep Learning Model) 950 which may correspond to the trained deep learning module 870 as well as to the trained thresholds output from the threshold training module 850. The trainable module 950 estimates impairments as described above. Then, a judgment module 990 decides based on the estimated impairments and by using the determined thresholds, whether or not a particular input received signal Rx is legitimate or illegitimate. In particular, the judgment module may compare the amount of a certain impairment source estimated with the respective threshold learned for said certain impairment source. This may be performed for all impairments.

The example of PLA making use of the impairment detection described above with reference to FIGS. 12 and 13 are not to limit the present disclosure. For example, instead of learning separate thresholds, the detected impairments may be input into a deep learning module which is trained to decide whether the impairments indicate that the signal impaired by them is legitimate or illegitimate. A condition three may be designed based on the impairment values and their combinations or the like. The output of the PLA may be a binary decision or it may be a probability with which the signal is legitimate/illegitimate. It is noted that the term illegitimate may be understood as anomalous in comparison with an expected (normal, legitimate) signal.

In summary, in the above example, multiple RF impairments are estimated and the signal is authenticated according to the estimated RF impairments and the threshold values. More specifically, if the difference between estimated RF impairments is above the respective thresholds, the user is considered as illegitimate and if the differences are below the thresholds, the user is considered as legitimate.

In general, after detecting the RF impairments, the impairments may be compared to certain thresholds which are designed according to some pre-authenticated values. If the impairments exceed the thresholds, the user can be considered as illegitimate. The threshold(s) can be selected according to a false and true alarm rate. In other words, the selection of threshold may depend on the scenario.

Exemplary Advantageous Effects

Some embodiments of the present disclosure may be used to detect and compensate RF impairments on physical layer, and they can be used in physical layer security. Additionally, some embodiments may be related to synchronization. Also, when high order modulations and high frequencies are used, the effect of RF impairments increases. For that reason, the present disclosure may be readily employed in these applications.

Some embodiments may allow detecting multiple RF impairments with a single model. For this model that can estimate all given impairments, there is no need to find out which particular impairments need to be detected as in usual in the prior art. Additionally, when applying a single model, the correlations between impairments are exploited. This may provide an RF impairment estimation with a higher accuracy.

Some embodiments may also be used for RF impairment compensation.

Furthermore, the present disclosure can be used in most of the cognitive radio applications such as spectrum sensing. Moreover, it may be effective in system performance especially in high order modulations and frequencies where the effect of RF impairments is increased. Besides, once the channel quality conditions and RF impairments are estimated using the presently disclose subject matter, the modulation order can be adjusted according to estimated values to provide efficiency. For example, when channel conditions improve, the modulation order can be increased and when the channel worsen, the modulation order can be decreased.

Some embodiments can be used in security, especially for authentication of the users. In conventional methods, ML-based models are used to identify if the user is legitimate or illegitimate without estimating the RF impairments. However, it is difficult to control if the estimation is correct or not when these models are used. This is because the ML model only gives information about the user legitimacy (as 1 or 0), not their impairments. Besides, estimating the RF impairments and legitimation of the user according to these impairments has advantages. For example, after estimating the impairments with the proposed method these impairments can be controlled with the model-based method to verify the estimations and thus, the decisions can be given more reliably. In other words, the present disclosure provides more awareness for authentication.

Implementations in Software and Hardware

The methodologies described herein may be implemented by various means depending upon the application. For example, these methodologies may be implemented in hardware, operation system, firmware, software, or any combination of two or all of them. For a hardware implementation, any processing circuitry may be used, which may comprise one or more processors. For example, the hardware may comprise one or more of application specific integrated circuits (ASICs), digital signal processors (DSPs), digital signal processing devices (DSPDs), programmable logic devices (PLDs), field programmable gate arrays (FPGAs), processors, controllers, any electronic devices, and/or other electronic circuitry units or elements designed to perform the functions described above.

If implemented as program code, the functions performed by the transmitting apparatus (device) may be stored as one or more instructions or code on a non-transitory computer readable storage medium such as the memory 610 or any other type of storage. The computer-readable media comprises physical computer storage media, which may be any available medium that can be accessed by the computer, or, in general by the processing circuitry 620. Such computer-readable media may comprise RAM, ROM, EEPROM, optical disk storage, magnetic disk storage, semiconductor storage, and/or other storage devices. Some particular and non-limiting examples comprise compact disc (CD), CD-ROM, laser disc, optical disc, digital versatile disc (DVD), Blu-ray (BD) disc and/or the like. Combinations of different storage media are also possible—in other words, distributed and heterogeneous storage may be employed.

The embodiments and exemplary implementations mentioned above show some non-limiting examples. It is understood that various modifications may be made without departing from the disclosed subject matter. For example, modifications may be made to adapt the examples to new systems and scenarios without departing from the central concept described herein.

Figure 15:
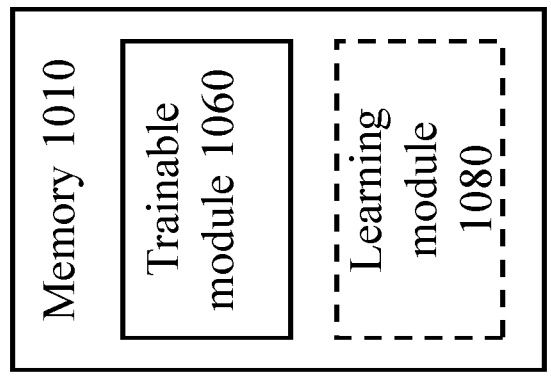
FIG. 15 is a block diagram illustrating an exemplary structure of a memory which may be a part of the apparatus for estimating impairments.
Figure 14:
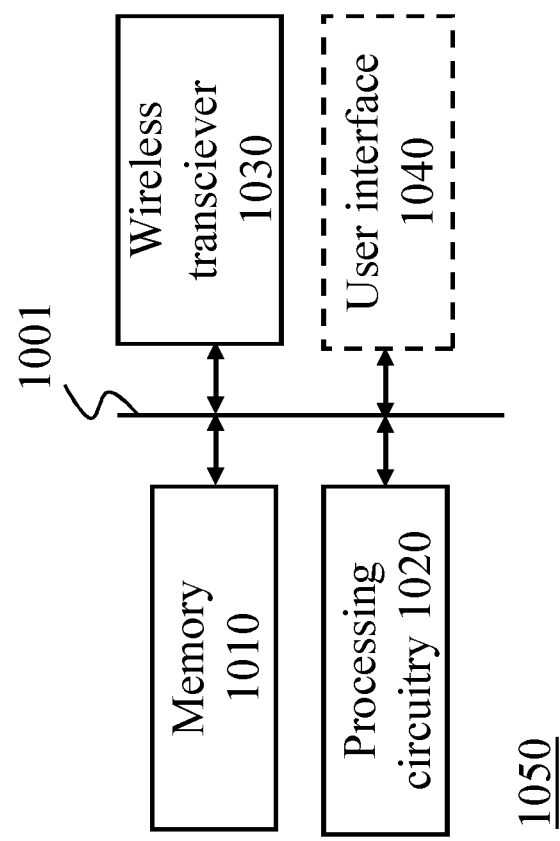
FIG. 14 is a block diagram illustrating an exemplary structure of an apparatus for estimating impairments.

FIG. 14 shows an exemplary structure of an apparatus 1050 for estimating multiple impairments. A wireless transceiver 1030 may receive the signal Rx, and pass it to the processing circuitry 1020. The processing circuitry 1020 may be configured, e.g., by a program fetched from the memory 1010 to perform the impairment estimation as described in any of the embodiments and examples above. The apparatus may have a user interface 1040, which may be used to control the training and/or inference phase or the like. The wireless transceiver 1030, the memory 1010, the processing circuitry 1020, and possibly the user interface 1040 may be interconnected via a bus 1001. FIG. 15 illustrates an example of memory 1010, comprising the trained (trainable) module program 1060 and the learning (training) module program 1080. It is noted that this implementation is only exemplary. There may be a different architecture for implementing the inference or testing or training phase, or any combination of those.

Selected Embodiments and Examples

Summarizing, methods and techniques are described for impairment detection for a wireless communication. The present disclosure relates to the detection of impairments in a received wireless communication signal. It may detect the presence of each of N types (sources) of impairments and possibly the amount of the impairment present in the received signal. The detection comprises processing of the received signal by a trainable module trained to distinguish N sources of impairments by applying learning, with N being an integer larger than one. The trainable module outputs, for each source j of the N sources, a contribution of the j-th source of impairments to the obtained signal. The contribution may be binary, indicating the presence or absence of the j-th source of impairment, or may also indicate the amount of impairment.

According to an embodiment, a method is provided for estimating radio frequency transmission impairments, the method comprising the steps of: obtaining a signal received over a wireless channel; processing the obtained signal by a trainable module trained to distinguish N sources of impairments, N being an integer larger than one; and outputting from the trainable module, for each source j of the N sources, a contribution of the j-th source of impairments to the obtained signal.

For example, the sources of impairments at the transmitter side comprise one or more of the following: frequency offset, phase offset, clock offset, power amplifier impairments, filter impairments, and/or modulation impairments.

In some embodiments, the contribution indicates one of presence or absence of contribution from a source of impairment to the received signal, and the step of processing the obtained signal further comprises the steps of: obtaining a feature vector which comprises an element for each source j of the N sources, the element indicating a degree of contribution of the j-th source of impairments to the obtained signal; and comparing whether each j-th element of the feature vector exceeds a threshold; and for each j-th element, setting contribution of the j-th element to TRUE in case the j-th element exceeds a threshold, and setting the j-th element to FALSE otherwise.

In some embodiments, the contribution of the j-th source of impairments to the obtained signal indicates a degree of the contribution which may take one of M values, M>2, and the step of processing the obtained signal outputs a feature vector which comprises a j-th element for each source j of the N sources, the j-th element indicating the degree of contribution of the j-th source of impairments to the obtained signal.

For instance, the machine learning comprises one or more types of machine learning methods comprising a multi-layer perceptron, long short-term memory, and/or convolutional neural network. In an exemplary implementation, at least two of the N sources of impairments are processed by different types of the machine learning methods.

The method may further comprise compensating the obtained signal based on the outputted contribution of the j-th source of impairments to the obtained signal.

In some embodiments, the signal received over a wireless channel is received from a transmitting device, and the method further comprises a step of transmitting an indication of the contribution for at least one of the N sources of impairments to the transmitting device. For example, the method may further comprise receiving, at the transmitting device, the indication of the contribution for at least one of the N sources of impairments; and applying, at the transmitting device, pre-distortion in accordance with the received indication.

The method may comprise performing a physical layer authentication based on the outputted contribution of the N sources of impairments to the obtained signal.

According to an embodiment, a method is provided for training a trainable module for estimating radio frequency transmission impairments, the method comprising the steps of: obtaining a training set comprising plural training data comprising input signal impaired by an impairment and by a transmission channel and an impairment indication indicating type of the impairment, signal; inputting the training set into the trainable module; adapting parameters of the trainable module according to the inputted training set; and storing the adapted parameters for use in said estimating radio frequency transmission impairments.

In an exemplary implementation, the obtaining of the training set comprises, for each training data in the training set, the steps of: generating an input signal, determining the impairment indication indicating type and/or parameters of the impairment; impairing the input signal with the impairment, obtaining impaired by the impairment and a transmission channel by transmitting the impaired input signal over a wireless channel and receiving the transmitted signal.

According to an embodiments, an apparatus is provided for estimating radio frequency transmission impairments, the apparatus comprising processing circuitry configured to: obtain a signal received over a wireless channel; process the obtained signal by a trainable module trained to distinguish N sources of impairments by applying supervised learning, N being an integer larger than one; and outputting from the trainable module, for each source j of the N sources, a contribution of the j-th source of impairments to the obtained signal.

For example, the processing circuitry is further configured to train the learning module by: obtaining a training set comprising plural training data comprising input signal impaired by an impairment and by a transmission channel and an impairment indication indicating type of the impairment, signal; inputting the training set into the trainable module; adapting parameters of the trainable module according to the machine learning using the inputted training set; and storing the adapted parameters for use in said estimating radio frequency transmission impairments.

According to an embodiment, an apparatus is provided for receiving a signal impaired with a plurality of impairments, the apparatus comprising: a receiver (which may be a simple input, not necessarily a complete wireless transceiver) for receiving a signal received over a wireless channel, the apparatus (as mentioned above) for estimating radio frequency transmission impairments in the received signal, a compensation module configured to: compensate the received signal for the estimated radio frequency transmission impairments, or transmitting an indication of the estimated radio frequency transmission impairments as a feedback to a transmitter from which the signal was received.

According to an embodiment, an apparatus is provided for training a trainable module for estimating radio frequency transmission impairments, the apparatus comprising: an input for obtaining a training set comprising plural training data comprising input signal impaired by an impairment and by a transmission channel and an impairment indication indicating type of the impairment, signal; the trainable module inputted the training set via the input; a learning module for adapting parameters of the trainable module according to the inputted training set; and a memory storing the adapted parameters for use in said estimating radio frequency transmission impairments.

In an exemplary implementation, the obtaining of the training set comprises, for each training data in the training set, generating an input signal, determining the impairment indication indicating type and/or parameters of the impairment; impairing the input signal with the impairment, obtaining impaired by the impairment and a transmission channel by transmitting the impaired input signal over a wireless channel and receiving the transmitted signal. Such obtaining of training set may be performed by the same apparatus as the apparatus for estimating the impairments, or in a separate apparatus, such as a computer or the like.

As also mentioned above for the method, also for the apparatuses the sources of impairments at the transmitter side comprise one or more of the following: frequency offset, phase offset, clock offset, power amplifier impairments, filter impairments, and/or modulation impairments. In some embodiments, the contribution indicates one of presence or absence of contribution from a source of impairment to the received signal. The processing circuitry may be configured for processing the obtained signal further by: obtaining a feature vector which comprises an element for each source j of the N sources, the element indicating a degree of contribution of the j-th source of impairments to the obtained signal; and comparing whether each j-th element of the feature vector exceeds a threshold; and for each j-th element, setting contribution of the j-th element to TRUE in case the j-th element exceeds a threshold, and setting the j-th element to FALSE otherwise. In some embodiments, the contribution of the j-th source of impairments to the obtained signal indicates a degree of the contribution which may take one of M values, M>2, and the step of processing the obtained signal outputs a feature vector which comprises a j-th element for each source j of the N sources, the j-th element indicating the degree of contribution of the j-th source of impairments to the obtained signal. For instance, the machine learning comprises one or more types of machine learning methods comprising a multi-layer perceptron, long short-term memory, and/or convolutional neural network. In an exemplary implementation, at least two of the N sources of impairments are processed by different types of the machine learning methods.

The apparatus may further comprise an impairment compensation module (which may be also embodied by the processing circuitry) compensating the obtained signal based on the outputted contribution of the j-th source of impairments to the obtained signal. In some embodiments, the signal received over a wireless channel is received from a transmitting device. The processing circuitry of the apparatus may further control the wireless transmitter to transmit an indication of the contribution for at least one of the N sources of impairments to the transmitting device. The transmitting device may be configured to receive the indication of the contribution for at least one of the N sources of impairments; and to apply, at the transmitting device, pre-distortion in accordance with the received indication.

The processing circuitry of the above-mentioned impairment estimation apparatus may be further configured to perform a physical layer authentication based on the outputted contribution of the N sources of impairments to the obtained signal.

Moreover, the corresponding methods are provided comprising steps performed by any of the above-mentioned processing circuitry implementations.

Still further, a computer program is provided, stored on a non-transitory medium, and comprising code instructions which when executed by a computer or by a processing circuitry, performs steps of any of the above-mentioned methods.

According to some embodiments, the processing circuitry and/or the transceiver is embedded in an integrated circuit, IC.

Any of the apparatuses of the present disclosure may be embodied on an integrated chip.

Any of the above-mentioned embodiments and exemplary implementations may be combined.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of this disclosure. For example, it is to be understood that the presently disclosed subject matter contemplates that, to the extent possible, one or more features of any embodiment can be combined with one or more features of any other embodiment.

The invention claimed is:

1. A method for estimating radio frequency transmission impairments, the method comprising:
   obtaining a signal received over a wireless channel;
   processing the obtained signal by a trainable model trained to distinguish N sources of impairments, N being an integer larger than one; and
   outputting from the trainable model, for each source j of the N sources, a contribution of the j-th source of impairments to the obtained signal;
   wherein the machine learning includes one or more types of machine learning methods comprising a multi-layer perceptron, long short-term memory, and/or convolutional neural network, and at least two of the N sources of impairments are processed by different types of the machine learning methods.

2. The method according to claim 1, wherein the sources of impairments at the transmitter side comprise one or more of the following:
   frequency offset,
   phase offset,
   clock offset,
   power amplifier impairments,
   filter impairments, and/or
   modulation impairments.

3. The method according to claim 1, wherein:
   the contribution indicates one of presence or absence of contribution from a source of impairment to the received signal, and processing the obtained signal further comprises:
obtaining a feature vector which comprises an element for each source j of the N sources, the element indicating a degree of contribution of the j-th source of impairments to the obtained signal; and
comparing whether each j-th element of the feature vector exceeds a threshold; and
for each j-th element, setting contribution of the j-th element to TRUE in case the j-th element exceeds a threshold, and setting the j-th element to FALSE otherwise.

4. The method according to claim 1, wherein:
the contribution of the j-th source of impairments to the obtained signal indicates a degree of the contribution which may take one of M values, M>2, and
processing the obtained signal outputs a feature vector which comprises a j-th element for each source j of the N sources, the j-th element indicating the degree of contribution of the j-th source of impairments to the obtained signal.

5. The method according to claim 1, further comprising:
compensating the obtained signal based on the outputted contribution of the j-th source of impairments to the obtained signal.

6. The method according to claim 1, wherein:
the signal received over a wireless channel is received from a transmitting device, and
the method further comprises transmitting an indication of the contribution for at least one of the N sources of impairments to the transmitting device.

7. The method according to claim 6, further comprising:
receiving, at the transmitting device, the indication of the contribution for at least one of the N sources of impairments; and
applying, at the transmitting device, predistortion in accordance with the received indication.

8. The method according to claim 1, further comprising:
performing a physical layer authentication based on the outputted contribution of the N sources of impairments to the obtained signal.

9. A method for training a trainable model for estimating radio frequency transmission impairments, comprising:
obtaining a training set comprising plural training data comprising input signal impaired by an impairment and by a transmission channel and an impairment indication indicating type of the impairment, signal;
inputting the training set into the trainable model;
adapting parameters of the trainable model according to the inputted training set; and
storing the adapted parameters for use in said estimating radio frequency transmission impairments.

10. The method according to claim 9, wherein the obtaining of the training set comprises, for each training data in the training set:
generating an input signal,
determining the impairment indication indicating type and/or parameters of the impairment;
impairing the input signal with the impairment, and
obtaining impaired by the impairment and a transmission channel by transmitting the impaired input signal over a wireless channel and receiving the transmitted signal.

11. An apparatus for estimating radio frequency transmission impairments, the apparatus comprising processing circuitry configured to:
obtain a signal received over a wireless channel;
process the obtained signal by a trainable model trained to distinguish N sources of impairments by applying supervised learning, N being an integer larger than one; and
outputting from the trainable model, for each source j of the N sources, a contribution of the j-th source of impairments to the obtained signal;
wherein the processing circuitry is further configured to train the learning module by:
obtaining a training set comprising plural training data including input signal impaired by an impairment and by a transmission channel and an impairment indication indicating type of the impairment, signal;
inputting the training set into the trainable module;
adapting parameters of the trainable module according to the machine learning using the inputted training set; and
storing the adapted parameters for use in said estimating radio frequency transmission impairments.

12. An apparatus for receiving a signal impaired with a plurality of impairments, the apparatus comprising:
a receiver for receiving a signal received over a wireless channel,
the apparatus according to claim 11 for estimating radio frequency transmission impairments in the received signal,
compensation circuitry configured to:
compensate the received signal for the estimated radio frequency transmission impairments, or
transmit an indication of the estimated radio frequency transmission impairments as a feedback to a transmitter from which the signal was received.

* * * * *